(12) United States Patent
Tsunematsu (10) Patent No.: US 10,218,899 B2
(45) Date of Patent: Feb. 26, 2019

(54) CONTROL METHOD IN IMAGE CAPTURE SYSTEM, CONTROL APPARATUS AND A NON-TRANSITORY COMPUTER-READABLE STORAGE MEDIUM

(71) Applicant: CANON KABUSHIKI KAISHA, Tokyo (JP)

(72) Inventor: Yuichi Tsunematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 14/475,867

(22) Filed: Sep. 3, 2014

(65) Prior Publication Data

US 2015/0077568 A1    Mar. 19, 2015

(30) Foreign Application Priority Data

Sep. 19, 2013   (JP) ................................ 2013-194586

(51) Int. Cl.
| | |
|---|---|
| *H04N 5/232* | (2006.01) |
| *H04N 7/18* | (2006.01) |
| *G06K 9/00* | (2006.01) |
| *G01V 8/20* | (2006.01) |
| *G08B 13/196* | (2006.01) |

(52) U.S. Cl.
CPC ........... *H04N 5/23222* (2013.01); *G01V 8/20* (2013.01); *G06K 9/00771* (2013.01); *G08B 13/19645* (2013.01); *H04N 7/181* (2013.01); *H04N 7/188* (2013.01)

(58) Field of Classification Search
CPC .... H04N 7/181; H04N 5/23222; H04N 7/188; G01V 8/20; G06K 9/00771

USPC .......................................................... 348/159
See application file for complete search history.

(56) References Cited

U.S. PATENT DOCUMENTS

| | | | | |
|---|---|---|---|---|
| 5,249,034 | A | * | 9/1993 | Minato ................. G01N 21/88 209/526 |
| 6,404,455 | B1 | | 6/2002 | Ito et al. |
| 7,375,744 | B2 | * | 5/2008 | Ono ...................... G06T 1/0007 348/211.99 |
| 8,520,951 | B2 | | 8/2013 | Tsunematsu |
| 8,797,381 | B2 | | 8/2014 | Tojo |
| 8,810,877 | B2 | | 8/2014 | Tsunematsu et al. |

(Continued)

FOREIGN PATENT DOCUMENTS

| | | |
|---|---|---|
| EP | 1427212 A1 | 6/2004 |
| JP | H08-116485 A | 5/1996 |

(Continued)

OTHER PUBLICATIONS

Office Action issued in Korean Patent Application No. 10-2014-0120816, dated Jun. 13, 2016.

(Continued)

*Primary Examiner* — Zaihan Jiang
(74) *Attorney, Agent, or Firm* — Venable LLP (57) ABSTRACT

In an image capture system having a first image capture apparatus and a second image capture apparatus, in a case where an analysis result of analysis processing on a captured image captured by the first image capture apparatus does not satisfy a predetermined condition, controls an imaging range of the second image capture apparatus so that the imaging range of the second image capture apparatus becomes wider than in a case where the analysis result satisfies the predetermined condition.

13 Claims, 4 Drawing Sheets

(56) References Cited

U.S. PATENT DOCUMENTS

| | | |
|---|---|---|
| 2004/0100563 A1 | 5/2004 | Sablak et al. |
| 2004/0125207 A1 | 7/2004 | Mittal et al. |
| 2005/0244033 A1* | 11/2005 | Ekin .................. G01S 3/7864 382/103 |
| 2006/0253512 A1* | 11/2006 | Nikitin ................ G06G 7/02 708/400 |
| 2008/0025571 A1* | 1/2008 | Nakao ................ H04N 5/3415 382/107 |
| 2009/0295918 A1* | 12/2009 | Horovitz ............. H04N 7/181 348/143 |
| 2010/0033579 A1 | 2/2010 | Yokohata et al. |
| 2011/0043628 A1 | 2/2011 | Yun |
| 2012/0081552 A1 | 4/2012 | Sablak et al. |
| 2013/0070105 A1* | 3/2013 | Ike .................. G06K 9/00355 348/169 |
| 2014/0078300 A1* | 3/2014 | Tine .................. G08B 13/196 348/143 |
| 2014/0369558 A1* | 12/2014 | Holz ................ G06K 9/00201 382/103 |
| 2016/0044257 A1* | 2/2016 | Venkataraman ..... H04N 5/2258 348/239 |

FOREIGN PATENT DOCUMENTS

| | | |
|---|---|---|
| JP | 2001-245284 A | 9/2001 |
| JP | 2002-290962 A | 10/2002 |
| JP | 3814779 B | 10/2002 |
| JP | 2003-274257 A | 9/2003 |
| JP | 2004-266404 A | 9/2004 |
| JP | 2007-135093 A | 5/2007 |
| JP | 2007-274703 A | 10/2007 |
| JP | 2008-103890 A | 5/2008 |
| JP | 2010-001441 A | 1/2010 |
| JP | 2010-161718 A | 7/2010 |
| KR | 10-2012-0104711 A | 9/2012 |
| WO | 03/096697 A1 | 11/2003 |
| WO | 2012/124852 A1 | 9/2012 |

OTHER PUBLICATIONS

Office Action issued in Russian Patent Application No. 2014137121, dated Jun. 14, 2016.

European Search Report issued in counterpart European Patent Application No. 14002895.2, dated Jan. 30, 2015.

Mar. 2016 Office Action in counterpart Russian Patent Application No. 2014137121/28(060117).

Ogawa et al., "Tracking Camera Systems Using Master-Slaving for Real Space," 9th Image Sensing Symposium, 2003, 6 pages in Japanese, 9 page translation.

Office Action dated Apr. 28, 2017, in Japanese Patent Application No. 2013-194586.

* cited by examiner

CONTROL METHOD IN IMAGE CAPTURE SYSTEM, CONTROL APPARATUS AND A NON-TRANSITORY COMPUTER-READABLE STORAGE MEDIUM

BACKGROUND OF THE INVENTION

Field of the Invention

The present invention relates to a control method in an image capture system having a first image capture apparatus and a second image capture apparatus, and to a control apparatus connected to a first image capture apparatus and a second image capture apparatus.

Description of the Related Art

In recent years, monitoring systems taking a form in which a plurality of cameras are employed in combination are increasing. With digitization and improvement in device capabilities, and by employing in combination cameras having differing characteristics, such as cameras having a wide-angle zoom and cameras capable of capturing in all directions, it becomes possible to configure a system taking advantage of the strong points of each of the cameras.

Approaches to capturing the same target with a plurality of cameras have been proposed previously. In Japanese Patent Laid-Open No. 2002-290962, a method is proposed in which, by transmitting template information, employed for recognizing a target in a first camera, to a second camera, tracking operations are coordinated.

Also, in "Tracking Camera Systems Using Master-Slaving for Real Space" (Ogawa Yuzo, Fujiyoshi Hironobu, 9th Image Sensing Symposium, 2003), a method of estimating three-dimensional space coordinates of feet after detecting the feet of an imaging target person from an image captured by a monocular camera, and performing image capturing having updated pan/tilt/zoom values on a second camera for which position information is calibrated in advance has been proposed.

Known techniques such as image processing, character detection, recognition, or the like, necessary to realize this kind of system are collected in "Computer Vision: Algorithms and Applications." (Richard Szeliski. Springer, New York, 2010).

In recent years, improvements in the capabilities of cameras have advanced, and by combining image capturing elements capable of recording many pixels with wide-angle lenses, the range that can be captured by a single camera has become wider. It is necessary to search for the same imaging target in a space wider than previously envisioned in order to coordinate cameras, and there are large problems in that there exists a searching time before image capturing starts, and in that the angle of view becomes misaligned. With the methods proposed previously, because the wider the imaging range of the camera becomes, the wider the region that must be searched becomes, a long time is required before the same image capturing target is found.

SUMMARY OF THE INVENTION

In the present invention, identical imaging targets are efficiently captured by a plurality of image capture apparatuses.

Also a feature of the present invention is to provide a control method of in an image capture system having a first image capture apparatus and a second image capture apparatus, the method comprising: deciding whether an analysis result of analysis processing on a captured image captured by the first image capture apparatus satisfies a predetermined condition; and in a case where the analysis result does not satisfy the predetermined condition, controlling an imaging range of the second image capture apparatus so that the imaging range of the second image capture apparatus becomes wider than in a case where the analysis result satisfies the predetermined condition.

Also a feature of the present invention is to provide a control method in an image capture system having a first image capture apparatus and a second image capture apparatus, the method comprising: setting an imaging range of a second image capture apparatus in accordance with a movement speed of an analysis target of analysis processing on a captured image captured by the first image capture apparatus, and controlling the second image capture apparatus so as to capture the set imaging range.

Further features of the present invention will become apparent from the following description of exemplary embodiments with reference to the attached drawings.

DESCRIPTION OF THE EMBODIMENTS

Embodiments of the present invention will be described hereinafter in detail, using the accompanying drawings.

Figure 1:
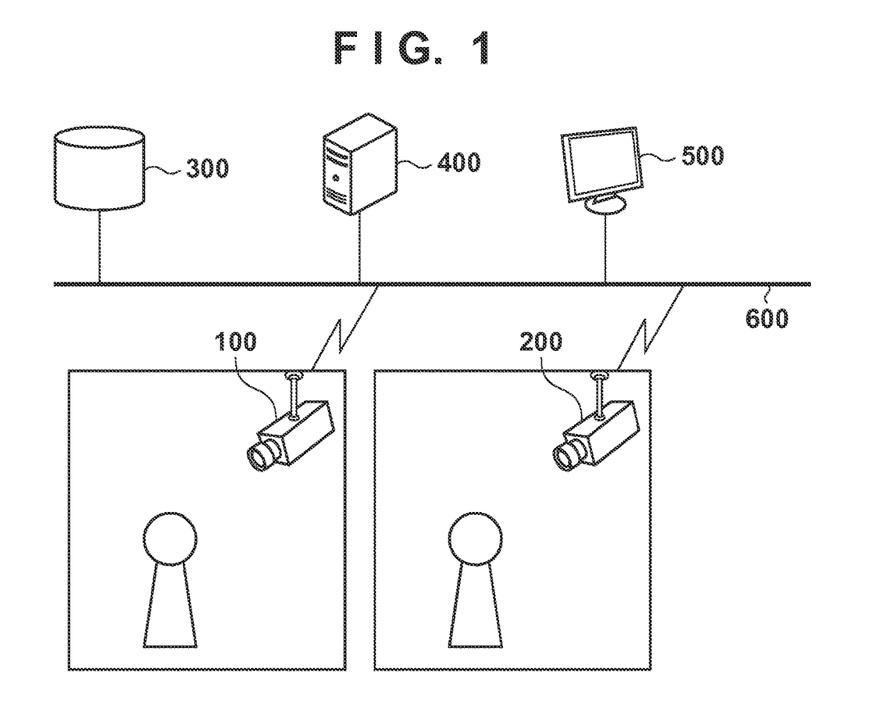
FIG. 1 is a configuration diagram of a camera management system of a first embodiment.

FIG. 1 is a configuration diagram of network connections illustrating an operation environment of a camera management system of a first embodiment. In the camera management system (image capture management system), when same imaging target is captured by a plurality of cameras, high speed identification of the imaging target is realized.

The camera management system is configured having a camera 100, a camera 200, a network storage apparatus 300, a camera management sever apparatus 400 (hereinafter referred to as server 400), and an image display apparatus 500 connected with each other by a LAN 600 which is a network line. The cameras 100 and 200, which are image capture apparatuses, have image processing capabilities for performing image analysis such as moving object detection, object detection, human body detection, facial recognition, or the like, on captured image data in addition to having imaging capabilities for capturing an imaging target. The network storage apparatus 300, which is a recording apparatus, records captured image data obtained from the camera 100 and the camera 200, and image analysis results of the captured image data via the LAN 600.

The server 400, which is an image capturing management apparatus, collects captured image data obtained from a plurality of cameras installed in the entire monitoring range (in this case the cameras 100 and 200), image analysis results of this captured image data, past image data recorded in the network storage apparatus 300 and image analysis results. The server 400 performs management of the image information over the entire monitoring range by using the collected image data and the image analysis results. Also, the server 400 is a control apparatus for controlling an imaging range of the camera 200.

The image display apparatus 500 overlaps and displays image data recorded in the network storage apparatus 300 and image analysis results. Also, the image display apparatus 500 performs display of image information managed on the server 400 over the entire monitoring range monitored by the cameras 100 and 200. In addition, the image display apparatus 500 further has an input function for performing an image search operation such as that for an event scene with an image analysis result based on image information. The image display apparatus 500 is realized as an information processing apparatus such as a personal computer (PC), for example. The camera 100 and the camera 200 may be configured as two or more (a plurality of) cameras, and there is no limit on the number of cameras if there are two or more. In other words, there may be a plurality of cameras capable of identifying an imaging target when the plurality of cameras capture the same target.

Next, explanation will be given using FIG. 2 for a hardware configuration of an information processing apparatus for realizing the server 400 and the image display apparatus 500.

Figure 2:
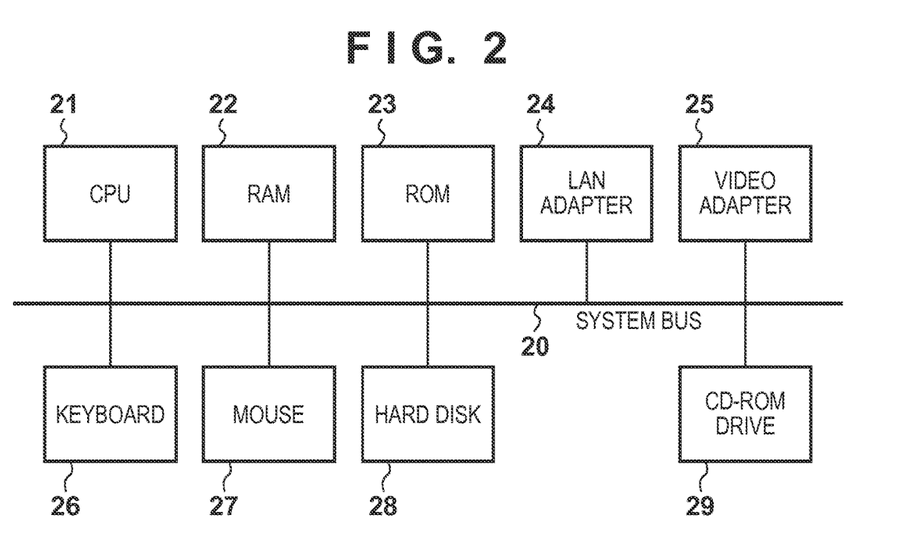
FIG. 2 is a view for representing a hardware configuration of a device that realizes the camera management system of the first embodiment.

FIG. 2 is a view for showing a hardware configuration of an information processing apparatus of the first embodiment of the present invention.

In FIG. 2, a CPU 21, a RAM 22, a ROM 23, a LAN adapter 24, a video adapter 25, a keyboard 26, a mouse 27, a hard disk drive 28, and a CD-ROM drive 29 are each connected to each other via a system bus 20. The system bus 20 may mean various types of buses such as, for example, a PCI bus, an AGP bus, a memory bus, or the like. Also, in FIG. 2, connection chips, a keyboard interface, and input/output interfaces such as so-called SCSI, or ATAPI interfaces between the buses are omitted.

The CPU 21 performs various operations such as basic arithmetic operations and comparative operations, and control of the hardware based on an operating system program, application programs, or the like. In the RAM 22, an operating system program, application programs, or the like, read out from a storage medium such as the hard disk drive 28, or a CD-ROM mounted in the CD-ROM drive 29, are stored, and these are executed under the control of the CPU 21. In the ROM 23, programs, such as a so-called BIOS which cooperates with the operating system and controls input and output to the hard disk drive 28, are stored.

The LAN adapter 24 performs communication with an external unit via the network cooperating with a communication program of the operating system controlled by the CPU 21. The video adapter 25 generates an image signal that is output to a display apparatus connected via the video adapter 25. The keyboard 26 and the mouse 27 are used for inputting instructions to the information processing apparatus.

The hard disk drive 28 stores an operating system, application programs, or the like. The CD-ROM drive 29 is used for installing application programs onto the hard disk drive 28 by mounting a storage medium such as a CD-ROM, a CD-R, a CD-R/W, or the like. Note that it goes without saying that in place of the CD-ROM drive 29 another drive apparatus such as a CD-R drive, a CD-R/W drive, or an MO drive may also be employed.

Figure 3:
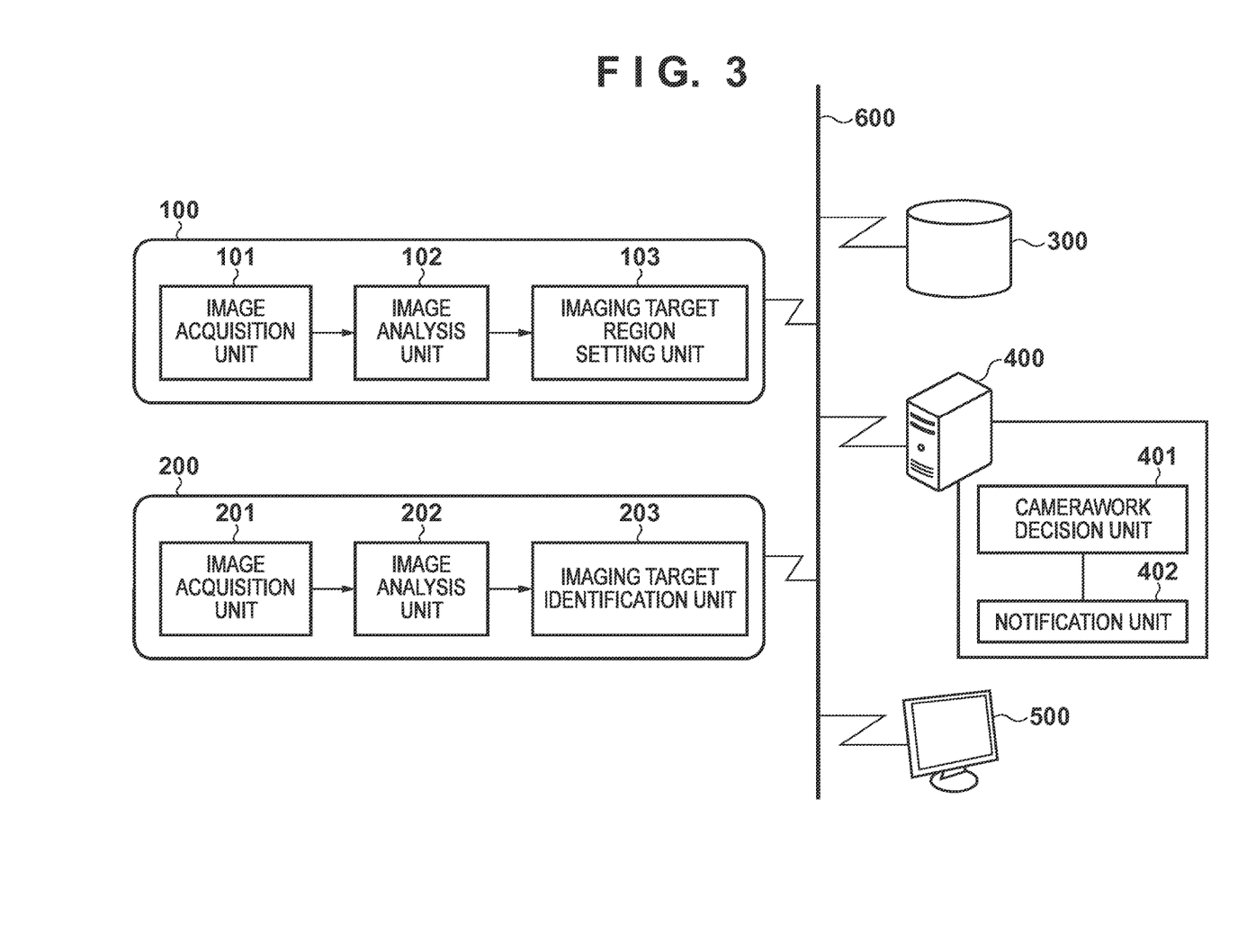
FIG. 3 is a block diagram for showing a main functional configuration in the device that realizes the camera management system of the first embodiment.

FIG. 3 is a block diagram for showing a main functional configuration in the device that realizes the camera management system of the first embodiment.

In FIG. 3, image acquisition units 101 and 201, in the cameras 100 and 200 respectively, perform predetermined pixel interpolation, color converting processing, or the like, on digital electrical signals obtained from a image capturing element such as a CMOS image capturing element, and develop/generate image data such as RGB or YUV image data (digital image data). Also, the image acquisition units 101 and 201 perform image-correction processing such as that for white balance, sharpness, contrast, color conversion, or the like, on image data after development is performed.

Image analysis units 102 and 202 perform image analysis processing such as moving object detection, object detection, human body detection, facial recognition, or the like, on a digital image obtained from the image acquisition units 101 and 201. In addition to the image analysis processing, an imaging target region is set by a setting unit 103 in the camera 100 (first camera) and imaging target identification is performed by an identification unit 203 in the camera 200 (second camera). Both the cameras 100 and 200 may also be provided with the setting unit 103 or the identification unit 203. The setting unit 103 of the camera 100 is used for controlling the imaging target region of an image acquired by the image acquisition unit 201 of the camera 200. The identification unit 203 of the camera 200 determines whether an imaging target included in an image acquired by the image acquisition unit 101 of the camera 100 and an imaging target included in an image obtained by the image acquisition unit 201 of the camera 200 are equivalent.

Image data on which various image processing has completed is compressed/encoded. Here, compression formats for distribution are based on standards such as MPEG4, H.264, MJPEG, or JPEG. Also, images are turned into image data files of formats such as mp4, mov or the like. Image information obtained from image analysis results and compressed image data files is transmitted to the network storage apparatus 300 or the server 400 via the LAN 600. On these apparatuses, image data and image analysis result recording is performed on a network file system such as NFS, CIFS, or the like, for example.

A camerawork decision unit 401 of the server 400 decides camera operations (pan/tilt/zoom, or the like) of the cameras in the camera management system based on received image data and image analysis results. More specifically, the camerawork decision unit 401 decides at least one initial value for pan, tilt, or zoom for the cameras, or decides an updating method for pan, tilt, and zoom. Configuration may be taken such that the CPU 21 of FIG. 2 realizes the camerawork decision unit 401 by executing a program read out from the RAM 22. A notification unit 402 notifies the camera 200 of a camera operation in order to control the camera 200 so as to capture with a camera operation that the camerawork decision unit 401 decides.

Detailed explanation will be given for processing for performing high speed imaging target identification when capturing the same target with a plurality of cameras in the above described configuration. Note that prior to the processing explained below, position information of each camera is measured in advance and recorded. The position information may be a relative position based on each of the cameras, and in a case where a predetermined camera installation position is made to be an origin, the position information may not be an actual position. The position information is used as base information when calculating pan/tilt/zoom values in the second camera. The position information is managed in consolidation in the server 400 or the network storage apparatus 300. In other words, position information of the cameras 100 and 200 is stored in the server 400 or in the RAM 22 of the network storage apparatus 300.

Firstly, a user selects a particular target in a captured image of the camera 100 (first camera) displayed on the image display apparatus 500. Here, the target (subject) that the user designates may be any of a person, a moving object, or an object. Note, in addition to the image display apparatus 500 being connected to the camera 100 and displaying captured images received from the camera 100, a state is such that setting of information to the camera 100 from the image display apparatus 500 is possible.

The image display apparatus 500 transmits target information related to the designated target to the camera 100 via the server 400. The target information transmitted here is coordinate information when the top-left position in the captured image of the camera 100 is made to be an origin.

Figure 4:
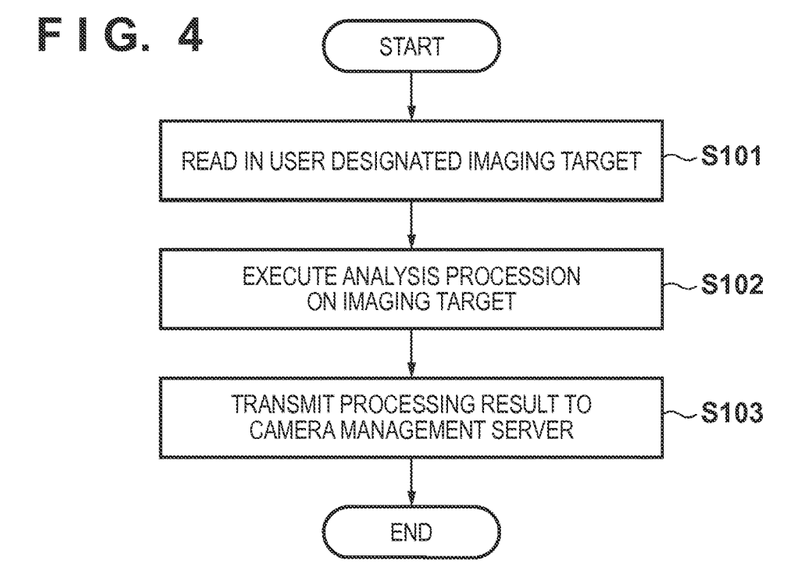
FIG. 4 is a flowchart for showing processing executed by a camera 100.

Next, using FIG. 4, explanation will be given for processing that the camera 100, which is the first camera, executes.

Firstly, in step S101, the camera 100 reads in information relating to an imaging target designated from a captured image on the image display apparatus 500. For the imaging target, a coordinate of a region including the imaging target is designated on the captured image, which is displayed on a display screen. For example, a region including the imaging target within the captured image displayed on the displayed screen is designated using a pointing device such as a mouse.

Next, in step S102, the camera 100 executes an image analysis, with the image analysis unit 102, of a region including the periphery of the designated imaging target. Learning result data of machine learning used for the image analysis of the image analysis unit 102 is prepared in advance on the server 400, and read in prior to the processing, and setting is applied. In other words, the image analysis unit 102 of the camera 100 acquires data necessary for image analysis from the server 400 in advance. Note that the image analysis may be performed on the server 400.

Also, a human body detected from an image acquired by the image acquisition unit 101 (or an object of a specific type such as an automobile) may be displayed on the image display apparatus 500, and the imaging target may be specified from the displayed human body, or the like, using a pointing device. A human body included in an image acquired by the image acquisition unit 101 is detected by the image analysis unit 102 analyzing the image.

In the image analysis by the image analysis unit 102, both analysis processing relating to a human body, and analysis processing relating to an object are executed. The image analysis unit 102 executes, for a human body, one or more of a human body detection, a face detection, a facial recognition, a face orientation detection, a facial organ detection, or a part recognition for a human body such as an age, a gender, a facial expression, a shoulder, feet, or height (human body characteristic recognition). Also, the image analysis unit 102 performs analysis of a size or a shape of an object, or performs detection of an object category for a chair, an automobile, or the like. The image analysis unit 102 executes human body/object common analysis processing as processing common to both human bodies and objects. Included in this common analysis processing is at least one of estimation of distance to a target, estimation of a three-dimensional position, and analysis of a movement direction and a movement speed of a target. The above described image analysis by the image analysis unit 102 may all be executed, or only a portion may be executed in accordance with camera capabilities, system settings, or the like.

Here, explanation will be given for processing content and image analysis results obtained for each kind of image analysis.

For the human body detection, a position of a face is detected in face detection in particular. For the position of the face, post-processing such as facial recognition, face orientation detection, facial organ detection, or the like, is used. This processing obtains a processing result probability (likelihood, score) matching a position and recognized processing target classification information in order to calculate a result by machine learning. Feet/shoulder width/height of a human body are used for accuracy improvement of later explained three-dimensional position estimation.

For the object detection, in particular a background difference, and a size or shape of an object are estimated using machine learning. Also, by examining a category of what an object is using machine learning, an approximate size for each category is obtained as reference information. Also, a probability of the category that an object is (likelihood, score) is obtained. For example, for a car, an approximate size may be made to be 5 m in length and 2 m in height, and similarly for shoulder width/height, later explained three-dimensional position estimation accuracy improvement is used.

Finally, a target movement direction and a target a movement speed are acquired using walking person detection by using a plurality of frames of images. Also, a target movement direction can be obtained by checking whether the size of the imaging target increases or decreases in a movement direction perpendicular to the camera.

In step S103, the camera 100 sets the imaging target region with the setting unit 103. The setting unit 103 divides the captured image into tile-shaped partial regions, prepares a positional relationship of actual three-dimensional regions corresponding to each of the partial regions (three-dimensional regions determining an image capturing space) as a correspondence table, and acquires an imaging target region from the correspondence relationship. The imaging target region is used for controlling the imaging target region of an image that the image acquisition unit 201 of the camera 200 acquires. Also, the setting unit 103 is able to set the imaging target region by estimating a three-dimensional position of an imaging target without using a correspondence table. Note that the estimation of the three-dimensional position is an estimation of a three-dimensional position of a human body for which the feet are captured. Also, the three-dimensional position of the object is calculable. In a case where the feet of the human body are not captured, it is possible to calculate an approximate position of a foot position of a subject by estimating the foot position of the subject by assuming a height of the imaging target to be a predetermined value defined in advance.

In a three-dimensional position estimation, one coordinate is calculated under a condition that only one solution is calculated from a light beam vector that extends in space toward the imaging target from a camera center point (center position). Because a misalignment with an actual position cannot be avoided when calculating a point at which a height is zero from a ground surface to be a condition, the shoulder width or the height may be estimated in the case of a human body, and an approximate distance to the subject may be calculated by comparing against an average value, and may be used as a condition upon three-dimensional position estimation. The same is true for the size or the shape of an object, and an average size for each object category such as automobiles, or chairs, may be prepared beforehand, and by comparison against the average size, an approximate distance may be estimated, and used as coordinate calculation information.

The results obtained in step S102 and in step S103 are collected, and transmitted to the server 400 as processing results, and the processing on the camera 100 completes. In the processing results transmitted to the server 400, coordinates of an imaging target region, characteristic amounts obtained by facial recognition, a likelihood of a human body detection or an object detection, a likelihood of a set imaging target region, or the like, are included.

Figure 5:
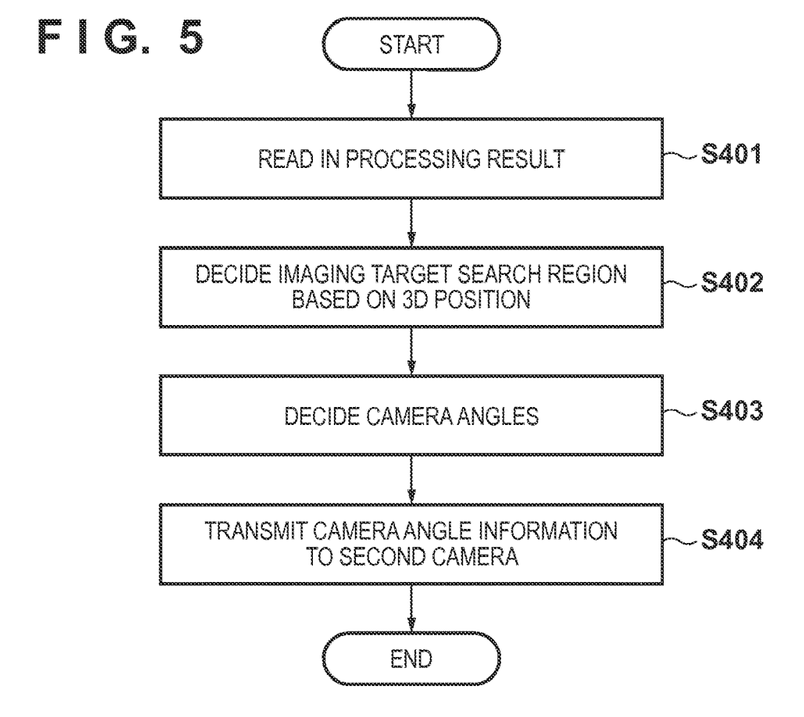
FIG. 5 is a flowchart for showing processing executed by a camera management sever apparatus.

FIG. 5 is a flowchart for showing processing executed by the camera management sever apparatus 400.

Firstly, in step S401, the camerawork decision unit 401 of the server 400 reads a three-dimensional position of an imaging target estimated by the camera 100 and a processing result for processing including analysis processing. Note that this processing may be performed on the server 400 in place of the camera 100.

Next, in step S402, the camerawork decision unit 401 of the server 400 sets an initial search range within a predetermined distance (within a predetermined area) that has a three-dimensional position of an imaging target, estimated by the camera 100, as the center position, and decides the search range based on the image analysis results. The imaging target region that the setting unit 103 of the camera 100 sets is a region at which the imaging target is estimated to exist, and the search range that the server 400 decides in step S402 includes the imaging target region, and is a region that the camera 200 captures. A magnification of the search range is performed by multiplying by a predetermined magnification ratio a number of times by which a magnification condition (a determination rule) is satisfied based on a determination rule of the image analysis result explained below. In other words, the following magnification conditions (determination rules) are set in advance. Also, the magnification factor is set such that the larger the number of times the predetermined magnification ratio is multiplied so that the conditional is satisfied, the larger the magnification factor becomes. Determination rules of each image analysis result are explained below.

Firstly, in a case where a likelihood obtained from an analysis result is less than a predetermined threshold, because the possibility is high that image capturing cannot be performed successfully or that the imaging target exists in a far location, the search range is magnified (widened) (this is something common to all image analysis).

Also, in a case where feet of the imaging target could not be detected, the search range is magnified. Also, in a case where characteristic information such as a shoulder/height, or the like, cannot be detected, and characteristic information is not used upon three-dimensional position estimation, the search range is magnified. The three-dimensional position is used for a decision of an imaging range or a search range, and the search range is used for decision of camera angles (image capture conditions).

Also, in a case where the movement speed of the imaging target is greater than or equal to a predetermined speed, a moveable range is calculated considering the movement speed, a movement direction, and a time period thought to be necessary until identification by the camera 200, and the search range is set in accordance with the moveable range. Furthermore, in a case where even though a movement speed is not fast, the imaging target is nearing the camera 200, the imaging range is magnified because there is the possibility that the imaging target will go out of the frame when zoom is set in a telephoto direction.

After the search range is decided in step S402, the camerawork decision unit 401 of the server 400, in step S403, based on image capture apparatus information such as an installation position of a camera 200, a corresponding zoom scaling factor, or the like, decides camera angles (image capture conditions such as zoom scaling factor, pan/tilt) on the camerawork decision unit 401. Here, the zoom scaling factor, or the like, is set so that the search range is included. Here, in step S403, after deciding the search range based on the initial search range based on the image analysis result, the camera angles are set so that the decided search range is included. However, configuration may be taken such that after the camera angles are decided based on the initial search range, the decided camera angles are corrected based on the image analysis result.

Finally, in step S404, the notification unit 402 of the server 400 transmits camera angle information indicating the decided camera angles to the camera 200 and the processing completes. Here, based on the processing result received from the camera 100, transmission may be performed in accordance with the type of the image analysis used in the imaging target identification processing on the camera 200, and it may be specified what image analysis result is used to identify the imaging target. In a case where an imaging target is identified using a characteristic amount obtained by a facial recognition, in step S404 the characteristic amount obtained by the image analysis unit 102 performing face recognition processing on the captured image of the camera 100 is transmitted to the camera 200.

Finally, using FIG. 6, explanation will be given for processing that the camera 200, which is the second camera, executes.

First, in step S201, the camera 200 reads in camera angle information that the server 400 transmits, and applies camera angle (zoom scaling factor, pan/tilt) values based on the camera angle information. In other words, the camera 200 controls a zoom lens based on the camera angle information so that the zoom scaling factor at which the camera 200 images becomes a zoom scaling factor included in the camera angle information. Also, the camera 200 controls a pan/tilt driving unit based on the camera angle information so that an imaging direction of the camera 200 becomes a direction matching a pan/tilt values included in the camera angle information. The camera 200 periodically acquires the camera angle information from the server 400.

Next, in step S202, the camera 200 searches for an imaging target candidate by executing the same image analysis processing as the image analysis processing executed on the camera 100. Because there will be the possibility that a plurality of imaging target candidates exist in step S202, the camera 200, in step S203, executes imaging target identification with the identification unit 203.

In step S205, the camera 200 compares an imaging target obtained from the analysis result of the camera 100, and an imaging target candidate obtained in step S202, and based on the comparison result, determines the existence or absence of the same imaging target. This determination uses a characteristic amount similarity level obtained by facial recognition on the compared imaging targets, for example.

In a case where the same imaging target is found (YES in step S205), the processing ends. Meanwhile, in a case where identical imaging target is not found (NO in step S205), the camera 200, in step S204, updates values of camera angles once again based on the image analysis result obtained in step S202. Here, search is re-executed raising the zoom scaling factor gradually while keeping the region so that the imaging target candidate fits into the region entirely. In step S204, the camera angles (zoom scaling factor, pan/tilt) are updated with the new values, and pan/tilt/zoom values of the camera 200 itself are updated. This processing is repeatedly executed until the identification of the imaging target completes.

As described above, the server 400 identifies an imaging target by controlling cooperation of a plurality of cameras.

Note that the start of this processing is made to be a designation of an imaging target by a user of the image display apparatus 500, but limitation is not made to this. For example, configuration may be taken such that the processing starts automatically if a moving object is detected by the camera, and a configuration may be taken in which the processing starts if a particular person or object is recognized.

Also, it was assumed that the image analysis is executed by the camera, but a configuration may be taken in which the camera only performs image capturing of the image, and the image analysis is executed on the server 400.

As explained above, according to the present embodiment, in a case where the same imaging target is captured while tracking the imaging target by a plurality of cameras, image analysis common between the cameras is executed, and imaging target (tracking target) searching and identification is executed using the image analysis results in coordination. In particular, by expanding a search range of an imaging target based on the image analysis result, it is possible to identify and track the imaging target efficiently under appropriate conditions. With this, identification of an imaging target can be performed at high speed.

In a second embodiment, explanation will be given for a configuration in which, in the imaging target existence region estimation of step S402 on the server 400, the imaging target existence region is refined based on image analysis results.

In other words, in the second embodiment, because in a case where a likelihood obtained from the analysis result is greater than or equal to a predetermined threshold, there is a high possibility that imaging is succeeding, or that the target exists nearby, the search range is reduced (narrowed) (common to all image analysis).

Also, in a case where feet of the imaging target can be detected, the search range is reduced. Also, in a case where characteristic information such as a shoulder/height, or the like, can be detected, or characteristic information is used upon three-dimensional position estimation, the search range is reduced.

Also, in a case where the movement speed of the imaging target is less than a predetermined speed, a moveable range is calculated considering the movement speed, and a time period thought to be necessary until identification by the camera 200, and the search range is set in accordance with the moveable range. Furthermore, in a case where even though the movement speed is not slow, the imaging target is getting farther from the camera 200, the search range is reduced because there is the possibility that the imaging target will be captured only minutely when zoom is set in wide-angle direction. Reduction of the search range is performed by multiplying a predetermined scaling factor a number of times by which a reducing condition (a determination rule) is satisfied.

Also, in the imaging target existence region estimation of step S402 on the server 400, both magnification and reduction of the region in which the imaging target exists may be performed, and adjustment (scaling) of the search range may be performed in combination with the arrangement of the first embodiment. Adjustment of the region is performed by multiplying a predetermined scaling factor based on above described determination rule.

As explained above, by the second embodiment, similarly to the first embodiment, by reducing a search range of an imaging target based on an image analysis result, it is possible to identify and track an imaging target efficiently with more appropriate conditions. With this, identification of an imaging target can be performed at high speed.

In a third embodiment, the camerawork decision unit 401 estimates a region where an imaging target may exist based on a movement speed and a movement direction of the imaging target obtained by the image analysis unit 102 based on position information obtained by a three-dimensional position estimation, and an anticipated time until imaging target identification processing on the camera 200 completes. Then, camera operations (camera angles) of the camera 200, which are image capture conditions, are decided so that the imaging target is included in the estimated range.

As explained above, by the third embodiment, in addition to the effects explained with the first and second embodiments, more appropriate image capture conditions can be set.

In a fourth embodiment, explanation will be given for a configuration in which, in the imaging target existence region estimation of step S402 (FIG. 5) on the server 400, the imaging target existence region is refined based on a human body/object existence probability distribution generated based on information related to a past imaging target (imaging target region information).

In other words, in the fourth embodiment, an imaging target region designated in the past is recorded on the image display apparatus 500 as a region for detecting the imaging target on the network storage apparatus 300 or the server 400. Then, by the server 400 referencing a recorded past imaging target region, it is possible use the recorded past imaging target region as a determination standard for which imaging region a human body or an object is likely to be positioned in. If a current imaging target exists in a region at which in the past a human body or an object existed at a higher probability than a predetermined threshold, the server 400 reduces the imaging target region in step S402. In an opposite case, by expanding the imaging target region, searching can be performed efficiently.

Figure 6:
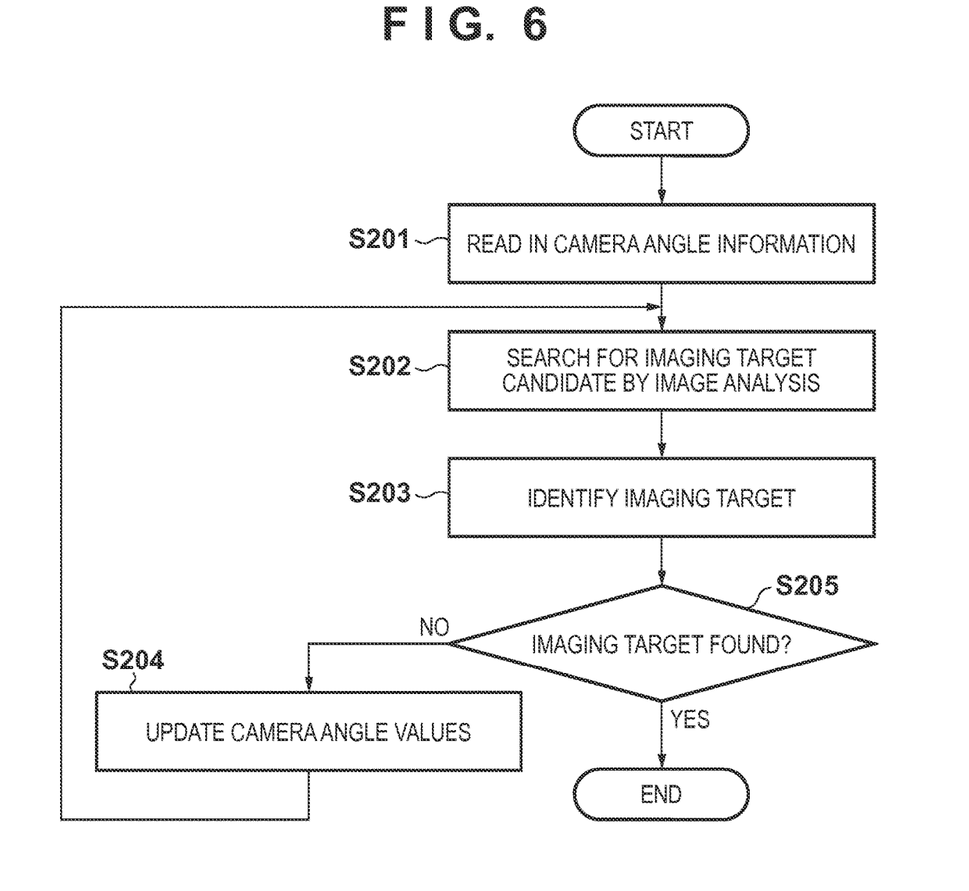
FIG. 6 is a flowchart for showing processing executed by a camera 200.

Also, configuration may be taken such that it is stored whether an imaging target is found in step S205 of FIG. 6 at the camera angles decided based on the imaging target region designated by the image display apparatus 500, and this is referenced the next time the camera angles are decided. In other words, in a case where an imaging target region designated on the image display apparatus 500 was designated in the past, the imaging target region is set as follows. In a case where, when the imaging target region was designated in the past, the imaging target was not found with the camera angles based on the imaging target region, and the imaging target region was widened, and, in step S204, imaging target candidates were re-searched, this time imaging target candidates are searched widening the imaging target region in advance. In a case where in the past an imaging target area A1 is widened to an imaging target area A2 and imaging target candidates are re-searched, this time, the searching for imaging target candidates at the imaging target area A1 is not performed, and imaging target candidates are searched for in the imaging target area A2. Note, the searching for imaging target candidates this time may be performed in an imaging target region A3 which is narrower than the area A2 and wider than the area A1. Whether the imaging target is found in step S205 is stored in the network storage apparatus 300 or the server 400.

As explained above, by the fourth embodiment, in addition to the effects of the first and second embodiments, searching of the imaging target can be performed efficiently by using past imaging target region information.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-194586, filed Sep. 19, 2013, which is hereby incorporated by reference herein in its entirety.

What is claimed is:

1. A control method in an image capture system having a first image capture apparatus and a second image capture apparatus, the method comprising:
   analyzing a captured image captured by the first image capture apparatus;
   deciding whether a likelihood of a capturing target that is an analysis result of the captured image is smaller than a predetermined threshold; and
   in a case where the likelihood is smaller than the predetermined threshold, controlling an imaging area of the second image capture apparatus so that the imaging area of the second image capture apparatus becomes wider than in a case where the likelihood is not smaller than the predetermined threshold until the capturing target is found in a captured image captured by the second image capture apparatus,
   wherein the controlling of the imaging area until the capturing target is found comprises: (a) making the imaging area wider, (b) determining whether or not the capturing target is found in the captured image captured by the second image capture apparatus using characteristic information on the capturing target, and (c) in response to the determination that the capturing target is not found in the captured image captured by the second image capture apparatus, repeating making the imaging area wider.

2. The method according to claim 1, wherein the imaging area of the second image capture apparatus is controlled so that the capturing target included in the captured image captured by the first image capture apparatus is captured.

3. The method according to claim 1, wherein the capturing target included in the captured image captured by the first image capture apparatus is detected from a captured image captured by the second image capture apparatus.

4. The method according to claim 1, wherein the imaging area of the second image capture apparatus is controlled based on past analysis processing.

5. A control apparatus connected to a first image capture apparatus and a second image capture apparatus, the control apparatus comprising:
   a processor configured to execute instructions stored in a memory so as to perform:
   (a) analyzing a captured image captured by the first image capture apparatus;
   (b) deciding whether a likelihood of a capturing target that is an analysis result of the captured image is smaller than a predetermined threshold; and
   (c) controlling, in a case where the likelihood is smaller than the predetermined threshold, an imaging area of the second image capture apparatus so that the imaging area of the second image capture apparatus becomes wider than in a case where likelihood is not smaller than the predetermined threshold until the capturing target is found in a captured image captured by the second image capture apparatus,
   wherein the imaging area is controlled by performing a process comprising: (a) making the imaging area wider, (b) determining whether or not the capturing target is found in the captured image captured by the second image capture apparatus using characteristic information on the capturing target, and (c) in response to the determination that the capturing target is not found in the captured image captured by the second image capture apparatus, repeating making the imaging area wider.

6. The control apparatus according to claim 5, wherein the controlling controls the imaging area of the second image capture apparatus so that the capturing target included in the captured image captured by the first image capture apparatus is captured.

7. The control apparatus according to claim 5, wherein the controlling transmits information for detecting the capturing target included in the captured image captured by the first image capture apparatus from a captured image captured by the second image capture apparatus to the second image capture apparatus.

8. A non-transitory computer-readable storage medium storing a computer program for a computer connected to a first image capture apparatus and a second image capture apparatus, the computer program comprising:
   analyzing a captured image captured by the first image capture apparatus;
   deciding whether a likelihood of a capturing target that is an analysis result of the captured image is smaller than a predetermined threshold; and
   in a case where the likelihood is smaller than the predetermined threshold, controlling an imaging area of the second image capture apparatus so that the imaging area of the second image capture apparatus becomes wider than in a case where the likelihood is not smaller than the predetermined threshold until the capturing target is found in a captured image captured by the second image capture apparatus, wherein the controlling of the imaging area until the capturing target is found comprises: (a) making the imaging area wider, (b) determining whether or not the capturing target is found in the captured image captured by the second image capture apparatus using characteristic information on the capturing target, and (c) in response to the determination that the capturing target is not found in the captured image captured by the second image capture apparatus, repeating making the imaging area wider.

9. The storage medium according to claim 8, wherein the imaging area of the second image capture apparatus is controlled so that the capturing target included in the captured image captured by the first image capture apparatus is captured.

10. A control method in an image capture system having a first image capture apparatus and a second image capture apparatus, the method comprising:
   obtaining a movement speed and a movement direction of an analysis target of analysis processing on a captured image captured by the first image capture apparatus;
   setting, by the image capture system, an imaging area of a second image capture apparatus in accordance with the obtained movement speed and the obtained movement direction;
   controlling the second image capture apparatus so as to capture the analysis target in the set imaging area,
   wherein the setting comprises estimating a region where the analysis target may exist, the estimating comprising (a) performing three dimensional position estimation and (b) using an anticipated time for image target identification processing completion.

11. The method according to claim 10, wherein the imaging area of the second image capture apparatus is controlled so that an analysis target included in the captured image captured by the first image capture apparatus is captured.

12. A control apparatus connected to a first image capture apparatus and a second image capture apparatus, the control apparatus comprising:
   a setting unit configured to, having obtained a movement speed and a movement direction of an analysis target of analysis processing on a captured image captured by the first image capture apparatus, set an imaging area of a second image capture apparatus in accordance with the obtained movement speed and the obtained movement direction; and
   a notification unit configured to notify the second image capture apparatus of the set imaging area so as to capture the analysis target by the second image capture apparatus,
   wherein the setting unit sets the imaging area by performing a process comprising estimating a region where the analysis target may exist, the estimating comprising (a) performing three dimensional position estimation and (b) using an anticipated time for image target identification processing completion.

13. A non-transitory computer-readable storage medium storing a computer program for a computer connected to a first image capture apparatus and a second image capture apparatus, the computer program comprising:
   obtaining a movement speed and a movement direction of an analysis target of analysis processing on a captured image captured by the first image capture apparatus;
   setting an imaging area of the second image capture apparatus in accordance with the obtained movement speed and the obtained movement direction; and
   notifying the second image capture apparatus of the set imaging area so as to capture the analysis target by the second image capture apparatus,
   wherein the setting comprises estimating a region where the analysis target may exist, the estimating comprising (a) performing three dimensional position estimation and (b) using an anticipated time for image target identification processing completion.

* * * * *